(12) United States Patent
Klosinski et al.

(10) Patent No.: US 10,174,639 B2
(45) Date of Patent: Jan. 8, 2019

(54) STEAM TURBINE PREHEATING SYSTEM

(71) Applicant: General Electric Company, Schenectady, NY (US)

(72) Inventors: Joseph Philip Klosinski, Kennesaw, GA (US); George Vargese Mathai, Atlanta, GA (US); Sanji Ekanayake, Mableton, GA (US); Alston Ilford Scipio, Mableton, GA (US); Paul Robert Fernandez, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/420,878

(22) Filed: Jan. 31, 2017

(65) Prior Publication Data

US 2018/0216497 A1 Aug. 2, 2018

(51) Int. Cl.

| F01K 7/16 | (2006.01) |
| F02C 3/04 | (2006.01) |
| F01K 13/02 | (2006.01) |
| F01K 7/38 | (2006.01) |
| F02C 6/18 | (2006.01) |
| F02C 7/26 | (2006.01) |
| F01K 23/10 | (2006.01) |

(52) U.S. Cl.
CPC .............. *F01K 13/02* (2013.01); *F01K 7/16* (2013.01); *F01K 7/38* (2013.01); *F01K 23/10* (2013.01); *F01K 23/101* (2013.01); *F02C 3/04* (2013.01); *F02C 6/18* (2013.01); *F02C 7/26* (2013.01); *F05D 2220/32* (2013.01); *F05D 2220/72* (2013.01)

(58) Field of Classification Search
USPC .............. 290/52; 60/39.12, 39.182, 772
See application file for complete search history.

(56) References Cited

U.S. PATENT DOCUMENTS

| 2,247,845 | A | * | 7/1941 | Meyer | F02C 6/003 |
| | | | | | 60/39.15 |
| 2,470,729 | A | * | 5/1949 | Stalker | F02C 7/08 |
| | | | | | 60/39.511 |
| 3,992,876 | A | * | 11/1976 | Aguet | F01K 23/103 |
| | | | | | 60/39.12 |
| 4,250,704 | A | * | 2/1981 | Bruckner | C01B 3/36 |
| | | | | | 60/39.12 |

(Continued)

FOREIGN PATENT DOCUMENTS

| EP | 0083109 A2 | 7/1983 |
| EP | 0537307 A1 | 4/1993 |
| EP | 2738360 A1 | 6/2014 |

OTHER PUBLICATIONS

Extended European Search Report and Opinion issued in connection with corresponding EP Application No. 18152078.4 dated Jun. 28, 2018.

*Primary Examiner* — Pedro J Cuevas
(74) *Attorney, Agent, or Firm* — Eversheds Sutherland (US) LLP

(57) ABSTRACT

The present application provides a power generation system. The power generation system may include a gas turbine engine for creating a flow of combustion gases, a steam turbine, and a steam turbine preheating system. The steam turbine preheating system may receive an extraction of the flow of combustion gases and delivers the extraction to the steam turbine to preheat the steam turbine.

20 Claims, 6 Drawing Sheets

(56) References Cited

U.S. PATENT DOCUMENTS

| | | | | |
|---|---|---|---|---|
| 4,465,027 | A * | 8/1984 | Steinegger | B01D 19/0068 122/406.4 |
| 4,584,836 | A | 4/1986 | McClelland | |
| 5,132,007 | A * | 7/1992 | Meyer | C10G 1/002 208/427 |
| 5,269,130 | A * | 12/1993 | Finckh | F01K 23/108 122/451 S |
| 5,365,730 | A * | 11/1994 | Bruckner | F01K 23/103 122/7 B |
| 5,412,936 | A | 5/1995 | Lee | |
| 5,473,898 | A | 12/1995 | Briesch | |
| 5,617,715 | A * | 4/1997 | Beer | F01K 23/06 423/235 |
| 5,887,418 | A * | 3/1999 | Bruckner | F01K 23/103 60/39.182 |
| 6,065,280 | A * | 5/2000 | Ranasinghe | F01K 23/10 60/39.181 |
| 6,244,033 | B1 * | 6/2001 | Wylie | F01K 23/103 60/39.182 |
| 6,519,927 | B2 | 2/2003 | Liebig | |
| 6,598,399 | B2 * | 7/2003 | Liebig | F01K 23/10 122/7 B |
| 6,983,585 | B2 * | 1/2006 | Hattori | F01K 9/04 60/39.182 |
| 7,367,192 | B2 * | 5/2008 | Hattori | F01K 9/04 60/39.182 |
| 8,484,975 | B2 | 7/2013 | West | |
| 8,505,309 | B2 * | 8/2013 | Gardiner | F02C 6/18 60/39.182 |
| 8,955,322 | B2 * | 2/2015 | Bronicki | F03G 6/005 60/641.8 |
| 9,046,037 | B2 * | 6/2015 | Broesamle | F02C 9/18 |
| 9,217,566 | B2 * | 12/2015 | Bloch | F22B 37/486 |
| 9,222,410 | B2 * | 12/2015 | Chillar | F02C 6/08 |
| 9,341,113 | B2 * | 5/2016 | John | F02C 3/30 |
| 9,404,393 | B2 * | 8/2016 | Pang | F01K 13/02 |
| 9,708,973 | B2 * | 7/2017 | Wall | F02M 21/0287 |
| 2005/0150229 | A1 | 7/2005 | Baer et al. | |
| 2005/0268594 | A1 | 12/2005 | Kurihara | |
| 2006/0254280 | A1 | 11/2006 | Briesch | |
| 2008/0236616 | A1 * | 10/2008 | Bloch | F22B 37/486 134/2 |
| 2009/0241551 | A1 * | 10/2009 | Grover | C01B 3/38 60/780 |
| 2010/0064855 | A1 * | 3/2010 | Lanyi | C21B 7/002 75/458 |
| 2010/0146982 | A1 * | 6/2010 | Lanyi | C21B 7/002 60/772 |
| 2012/0031101 | A1 | 2/2012 | Hoffmann et al. | |
| 2012/0260667 | A1 * | 10/2012 | Chillar | F02C 6/08 60/779 |
| 2012/0317988 | A1 * | 12/2012 | Gardiner | F02C 6/18 60/772 |
| 2013/0125557 | A1 | 5/2013 | Scipio | |
| 2013/0160424 | A1 * | 6/2013 | Broesamle | F02C 7/185 60/39.182 |
| 2013/0178677 | A1 * | 7/2013 | Schmid | B01D 53/62 585/325 |
| 2014/0109844 | A1 * | 4/2014 | Wall | F02B 43/00 123/3 |
| 2014/0110092 | A1 * | 4/2014 | John | F02C 3/30 165/138 |
| 2014/0174477 | A1 * | 6/2014 | Bloch | F22B 37/486 134/22.15 |
| 2014/0174559 | A1 * | 6/2014 | Bloch | F22B 37/486 137/238 |
| 2014/0230862 | A1 * | 8/2014 | Bloch | F22B 37/486 134/109 |
| 2014/0237839 | A1 * | 8/2014 | Bloch | F22B 37/486 34/92 |
| 2014/0238507 | A1 * | 8/2014 | Bloch | F22B 37/486 137/377 |
| 2015/0136046 | A1 * | 5/2015 | Millner | F01K 23/064 122/7 A |
| 2015/0345390 | A1 | 12/2015 | Ekanayake | |
| 2015/0345393 | A1 | 12/2015 | Ekanayake | |
| 2015/0345401 | A1 | 12/2015 | Ekanayake | |
| 2016/0040596 | A1 | 2/2016 | Klosinski | |
| 2016/0123190 | A1 | 5/2016 | Klosinski | |
| 2016/0258327 | A1 | 9/2016 | Klosinski | |
| 2016/0273408 | A1 | 9/2016 | Ekanayake | |
| 2016/0290214 | A1 | 10/2016 | Ekanayake | |
| 2016/0290232 | A1 | 10/2016 | Ekanayake | |
| 2016/0290235 | A1 | 10/2016 | Ekanayake | |
| 2016/0326960 | A1 * | 11/2016 | Baladi | F02C 7/12 |
| 2017/0254225 | A1 * | 9/2017 | Kim | F01K 11/02 |
| 2018/0058334 | A1 * | 3/2018 | Mathai | F02C 9/20 |
| 2018/0073440 | A1 * | 3/2018 | Mathai | F01D 11/22 |
| 2018/0100442 | A1 * | 4/2018 | Mathai | F02C 9/52 |
| 2018/0119577 | A1 * | 5/2018 | Zhang | F01K 3/20 |
| 2018/0216499 | A1 * | 8/2018 | Mathai | F01K 13/003 |
| 2018/0274391 | A1 * | 9/2018 | Mathai | F01K 23/101 |
| 2018/0298816 | A1 * | 10/2018 | Conde | F02C 6/18 |

* cited by examiner

STEAM TURBINE PREHEATING SYSTEM

TECHNICAL FIELD

The present application and the resultant patent relate generally to turbomachinery and more particularly relate to a power generation system with a steam turbine having a preheating system for using hot combustion gas extractions from a gas turbine to warm the steam turbine during start-up.

BACKGROUND OF THE INVENTION

A power generation plant such as a combined cycle power generation system generally includes a gas turbine engine, a heat recovery steam generator, and a steam turbine. The gas turbine engine may be coupled with a generator to produce electricity or to drive other types of loads. The hot combustion gases from the gas turbine engine may be introduced into the heat recovery steam generator to generate a flow of steam. The flow of steam in turn may drive the steam turbine. The steam turbine also may be coupled to a generator to produce additional electricity. A co-generation power generation system and the like may operate in a similar manner to produce both electricity and heat.

Minimizing start-up times may improve the availability of the combined cycle power plant and may reduce overall maintenance costs and start-up emissions. Steam turbine start-up, however, may be slow relative to gas turbine start-up. The start-up time of the steam turbine may be limited by thermal stresses caused by temperature gradients between, for example, the rotor core and the blades. As the rotor temperature is increased, higher inlet steam temperatures may be allowed. Gas turbine output, however, may not be allowed to increase until the steam turbine and the internal rotor are heated to a sufficient temperature. Running the gas turbine at such a low output may reduce the overall power generation, may waste fuel, and may cause higher concentrations of emissions.

SUMMARY OF THE INVENTION

The present application and the resultant patent thus provide a power generation system. The power generation system may include a gas turbine engine for creating a flow of combustion gases, a steam turbine, and a steam turbine preheating system. The steam turbine preheating system may receive an extraction of the flow of combustion gases and delivers the extraction to the steam turbine to preheat the steam turbine.

The present application and the resultant patent further provide a method of preheating a steam turbine in a power generation system. The method may include the steps of extracting hot combustion gases from a gas turbine, filtering the extraction of the hot combustion gases, and flowing the extraction of the hot combustion gases to warm a shell of the steam turbine.

The present application and the resultant patent further provide a combined cycle power generation system. The combined cycle power generation system may include a gas turbine engine for creating a flow of combustion gases, a steam turbine, a heat recovery steam generator, and a steam turbine preheating system. The steam turbine preheating system may receive an extraction of the flow of combustion gases and delivers the extraction to the steam turbine to preheat the steam turbine.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
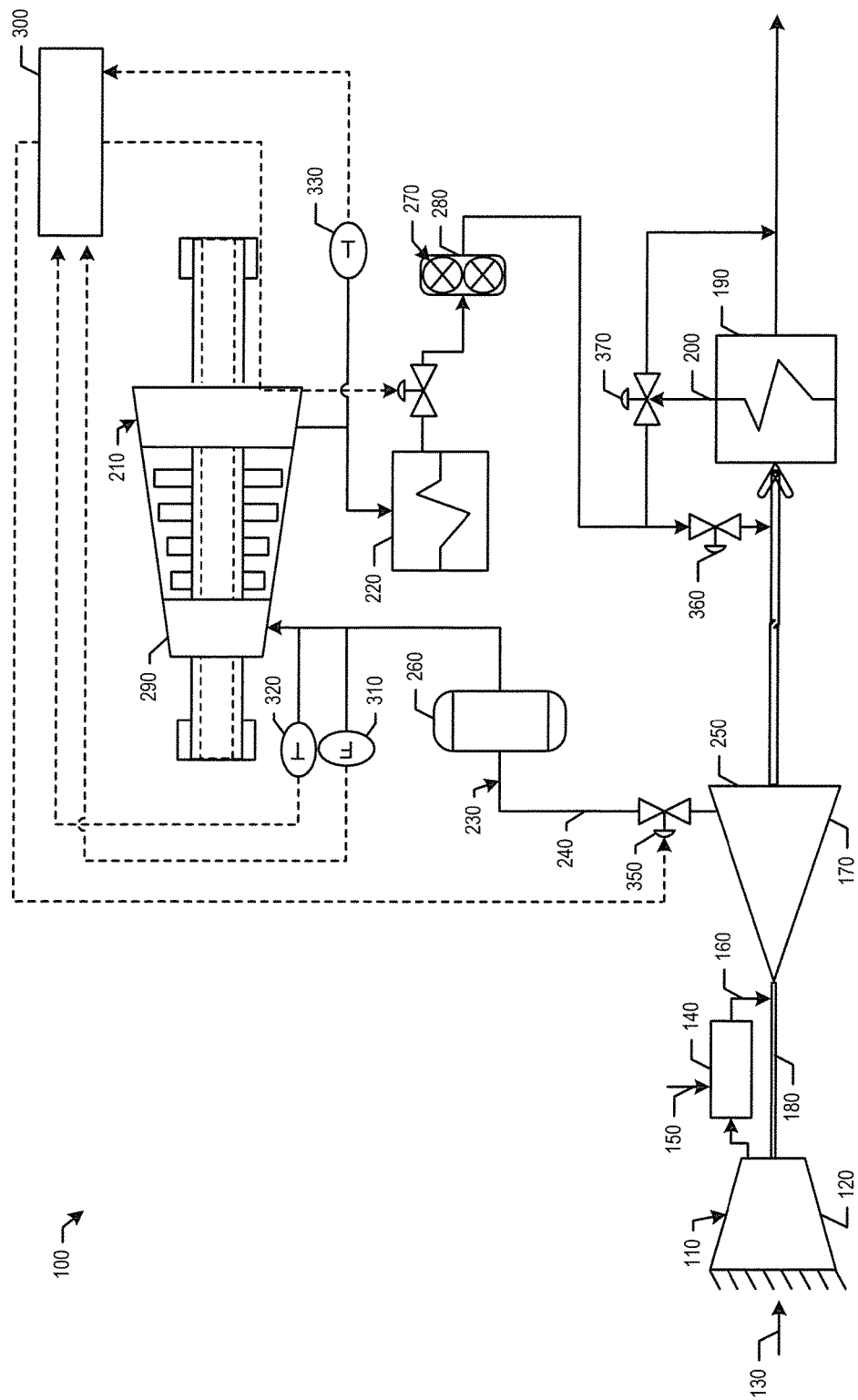
FIG. 1 is a schematic diagram of a combined cycle power generation system with a steam turbine preheating system as may be described herein.

Referring now to the drawings, in which like numerals refer to like elements throughout the several views, FIG. 1 shows a schematic diagram of a combined cycle power generation system 100 as may be described herein. The combined cycle power generation system 100 may include a gas turbine engine 110. The gas turbine engine 110 may include a compressor 120. The compressor 120 compresses an incoming flow of air 130. The compressor 120 delivers the compressed flow of air 130 to a combustor 140. The combustor 140 mixes the compressed flow of air 130 with a pressurized flow of fuel 150 and ignites the mixture to create a flow of hot combustion gases 160. Although only a single combustor 140 is shown, the gas turbine engine 110 may include any number of combustors 140 positioned in a circumferential array or otherwise. The flow of combustion gases 160 is in turn delivered to a turbine 170. The flow of combustion gases 160 drives the turbine 170 so as to produce mechanical work. The mechanical work produced in the turbine 170 drives the compressor 120 via a shaft 180 and an external load such as an electrical generator and the like.

The gas turbine engine 110 may use natural gas, various types of syngas, liquid fuels, and/or other types of fuels and blends thereof. The gas turbine engine 110 may be any one of a number of different gas turbine engines offered by General Electric Company of Schenectady, N.Y., including, but not limited to, a 7 or a 9 series heavy duty gas turbine engine and the like. The gas turbine engines 110 may have many different configurations and may have other types of components. Other types of gas turbine engines also may be used herein. Multiple gas turbine engines, other types of turbines, and other types of power generation equipment also may be used herein together.

The combined cycle power generation system 100 may include a heat recovery steam generator 190. The heat recovery steam generator 190 may recover heat from the hot combustion gases 160 exiting the gas turbine engine 110 so as to create a flow of steam 200. The heat recovery steam generator 190 may be of conventional design and may include one or more pressure sections such as a high pressure section, an intermediate pressure section, and a low pressure section. Each pressure section may include any combination of evaporators, superheaters, economizers, and the like. Other components and other configurations may be used herein.

The combined cycle power generation system 100 also may include a steam turbine 210. The steam turbine 210 may be of conventional design and may include one or more pressure sections such as a high pressure section, an intermediate pressure section, and a low pressure section. The flows of steam 200 from the heat recovery generator 190 may be expanded in the steam turbine 210 so as to drive an additional load such as an electrical generator and the like. The steam turbine 210 may include a condenser 220 for the recovery of the spent fluid flow therein. Other components and other configurations may be used herein.

The combined cycle power generation system 100 also may include a steam turbine preheating system 230. The steam turbine preheating system 230 may include one or more extractions 240 of the hot combustion gases 160 from a casing 250 of the turbine 170 or elsewhere. The casing 250 may be modified to include flanges at various stages to allow for the extractions 240. The extractions 240 may be in communication with a shell 290 of the steam turbine 210 so as to preheat the steam turbine 210 before and/or during start-up via a filter system 260. The filter system 260 may clean the combustion gases 160 in a conventional fashion. The filter system 260 may include conventional filters, electrostatic precipitator filters, a catalyst bed, a scrubber, and the like. The combustion gases 160 exiting the steam turbine shell 290 may pass through the condenser 220 or otherwise for heat exchange therein. Depending upon the temperature, the combustion gases 160 then may flow either upstream of the heat recovery steam generator 190 so as to exchange heat therein or downstream of the heat recovery steam generator 190 towards the main stack or otherwise. The condenser 220 may be evacuated via a condenser evacuation device 270. The condenser evacuation device 270 may be a blower 280 and the like as shown. Other types of air movement devices may be used herein. Further, the condenser evacuation device 270 also may be a steam ejector, a turbine exhaust ejector, a compressor extraction ejector, and the like. Other components and other configurations also may be used herein.

Overall control of the steam turbine preheating system 230 may be governed via a controller 300. The controller 300 may be any type of programmable logic device. The controller 300 may be local or remote. The controller 300 may receive data from a number of sensors in communication with the steam turbine preheating system 230. These sensors may include a flow rate sensor 310 and one or more temperature sensors. In this case, a first temperature sensor 320 and a second temperature sensor 330. Other types of sensors may be used herein. Based upon the data from the sensors and the overall steam turbine controls, the controller 300 may open and close the steam turbine preheating system 230 via an inlet valve 350 and one or more outlet valves. In this embodiment, a first outlet valve 360 and a second outlet valve 370 are shown. Other types of flow control devices and the like also may be used herein. Other components and other configurations may be used herein.

In use, the controller 300 may receive information on overall operational parameters of the steam turbine 210 via the steam turbine controls including, for example, the temperature of the rotor and/or the blades. In order to preheat the steam turbine 210, the controller 300 may open the inlet valve 350 of the steam turbine preheating system 230 so as to allow the extraction 240 of the hot combustion gases 160 from the turbine casing 250 to flow to the steam turbine shell 290 to warm the steam turbine 210.

The controller 300 may monitor the flow rate and the temperature of the extraction 240 via the flow rate sensor 310 and the first temperature sensors 320. Once the steam turbine 210 reaches a predetermined temperature, the controller 300 may turn off the steam turbine preheating system 230 by closing the inlet valve 350 or otherwise. Closing the inlet valve 350 directs all of the combustion gases 160 towards the turbine 170 and the heat recovery steam generator 190. Other components and other configurations may be used herein.

The controller 300 also may monitor the temperature of the combustion gases 160 leaving the shell 290 of the steam turbine 210 via the second temperature sensor 280. Depending upon the temperature, the controller 300 may direct the flow either upstream or downstream of the heat recovery steam generator 190 by opening or closing the outlet valves 360, 370. The controller 300 may direct the flow into the heat recovery steam generator 190 if, for example, the temperature of the flow is above about 250 degrees Fahrenheit (121 degrees Celsius) or so. Other temperatures may be used herein. The ejector systems may be used herein to increase the mass flow rate. Other components and other configurations may be used herein.

Figure 2:
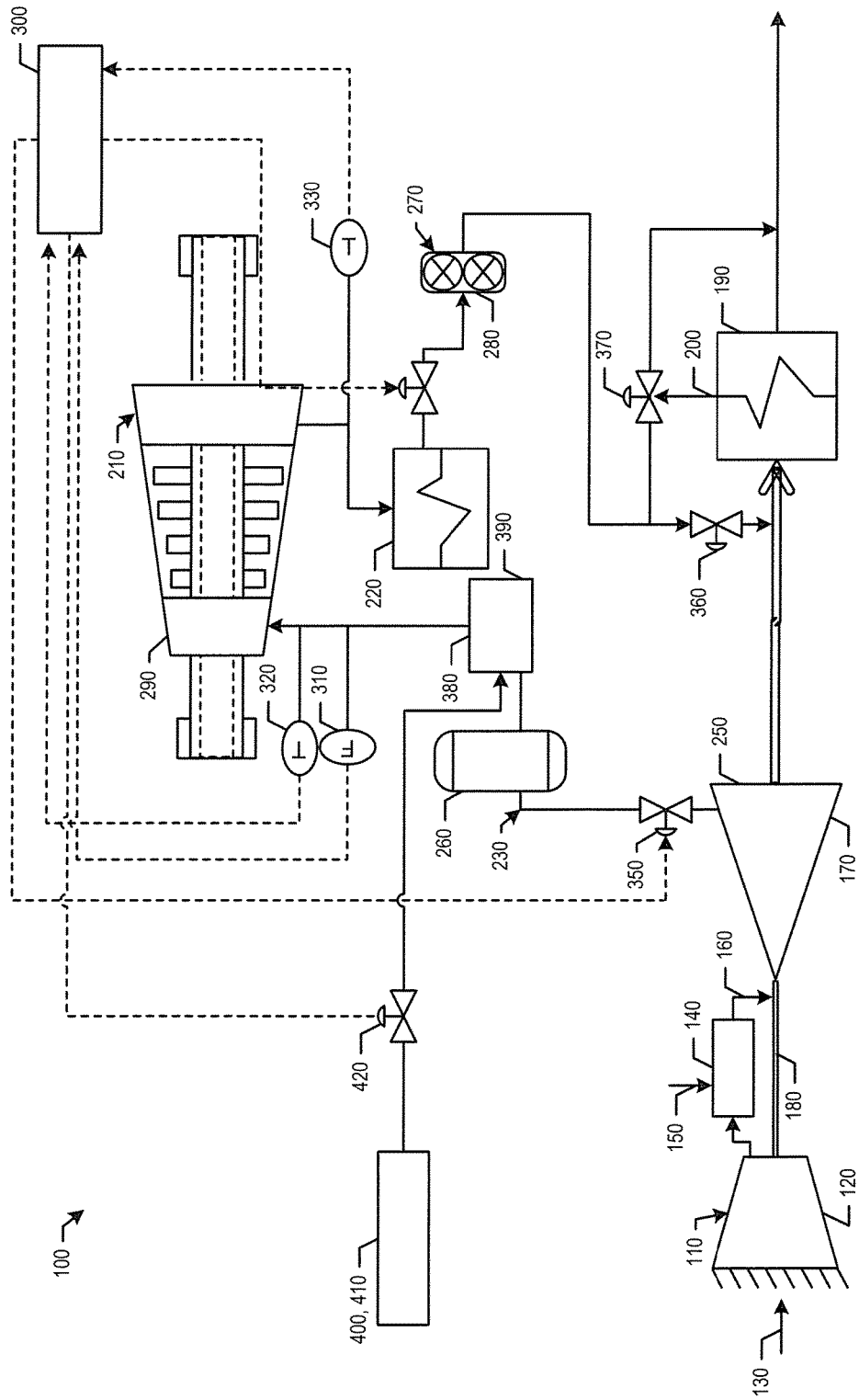
FIG. 2 is a schematic diagram of an alternative embodiment of a combined cycle power generation system with a steam turbine preheating system as may be described herein.

FIG. 2 shows a further embodiment of the steam turbine preheating system 230 as may be described herein. In this example, the steam turbine preheating system 230 may include an attemperation system 380 positioned on the extraction 240. The attemperation system 380 may include a spray system 390 in communication with either a water injection 400 or a steam injection 410 via a spray system valve 420. The spray system 390 may be an in-line mixer, a spray chamber, or any type of conventional device for tempering a fluid flow. Specifically, the spray system 390 may use either the water injection 400 or the steam injection 410 for temperature control of the flow of combustion gases 160. The controller 300 may operate the attemperation system 380 via the spray system valve 420 based upon the temperature of the flow of combustion gases 160 determined by the first temperature sensor 320 or otherwise. Other components and other configurations may be used herein.

Figure 3:
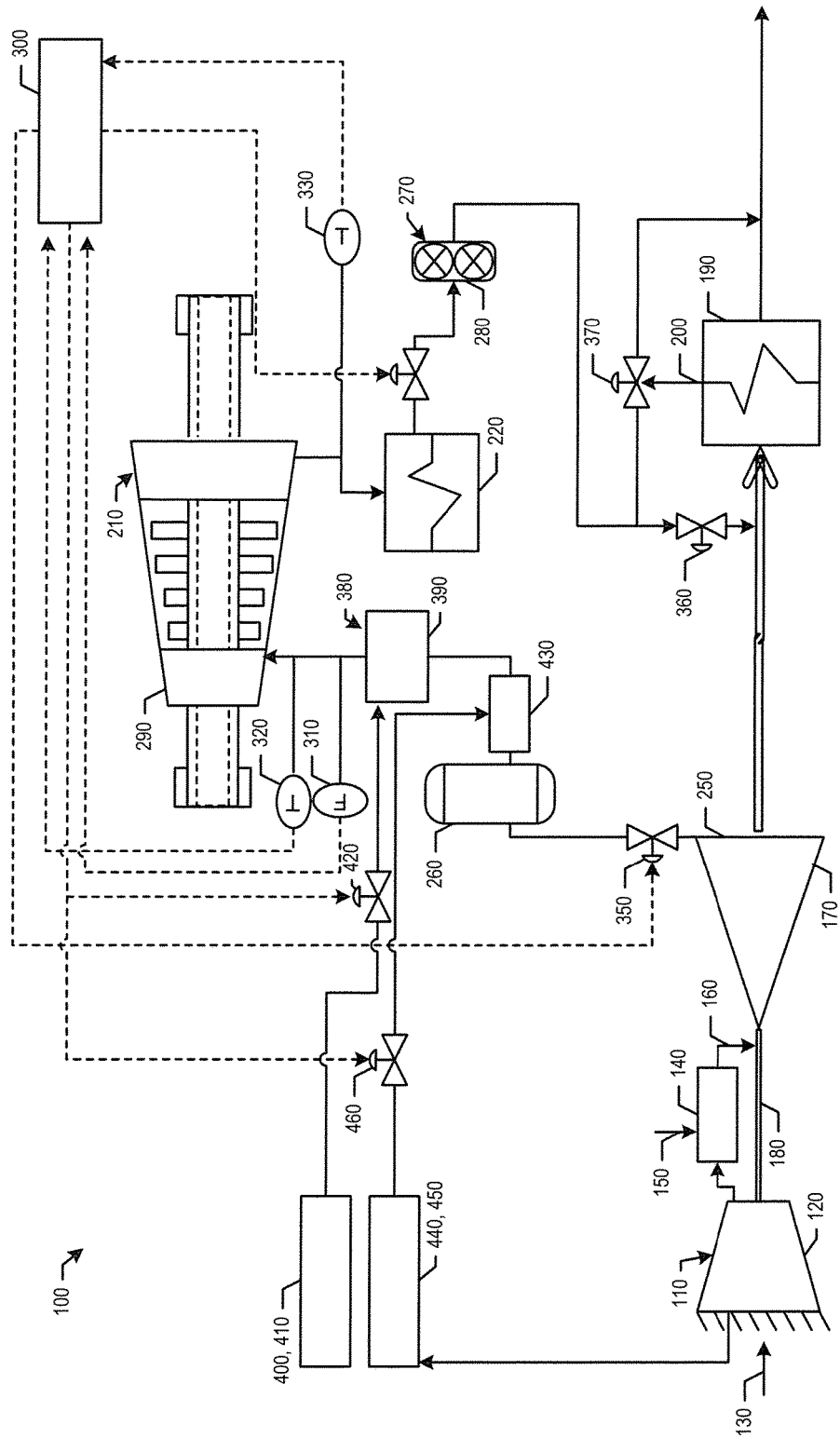
FIG. 3 is a schematic diagram of an alternative embodiment of a combined cycle power generation system with a steam turbine preheating system as may be described herein.

FIG. 3 shows a further embodiment of the steam turbine preheating system 230 as may be described herein. In this example, an ejector 430 may be positioned on the extraction 240 from the casing 250 of the turbine 170. The ejector 430 may be positioned downstream of the filter system 260 and upstream of the spray system 390. Other positions may be used herein. The ejector 430 may be in communication with a source of ambient air 440 or filtered air 450 via an ejector valve 460. The ejector 430 pulls in the ambient air or the filtered air so as to increase the mass flow rate of the flow of the hot combustion gases 160 flowing through the spray system 390 to the shell 290 of the steam turbine 210. The ejector 430 may be of conventional design. Specifically, the ejector 430 may be a mechanical device with no moving parts. The ejector 430 mixes two fluid streams based on a momentum transfer. The flow of ambient air or filtered air to the ejector 430 may be controlled by an ejector valve 460. The flow rate may be monitored by the controller 300 via the flow rate sensor 310 or otherwise. Other components and other configurations may be used herein.

Figure 4:
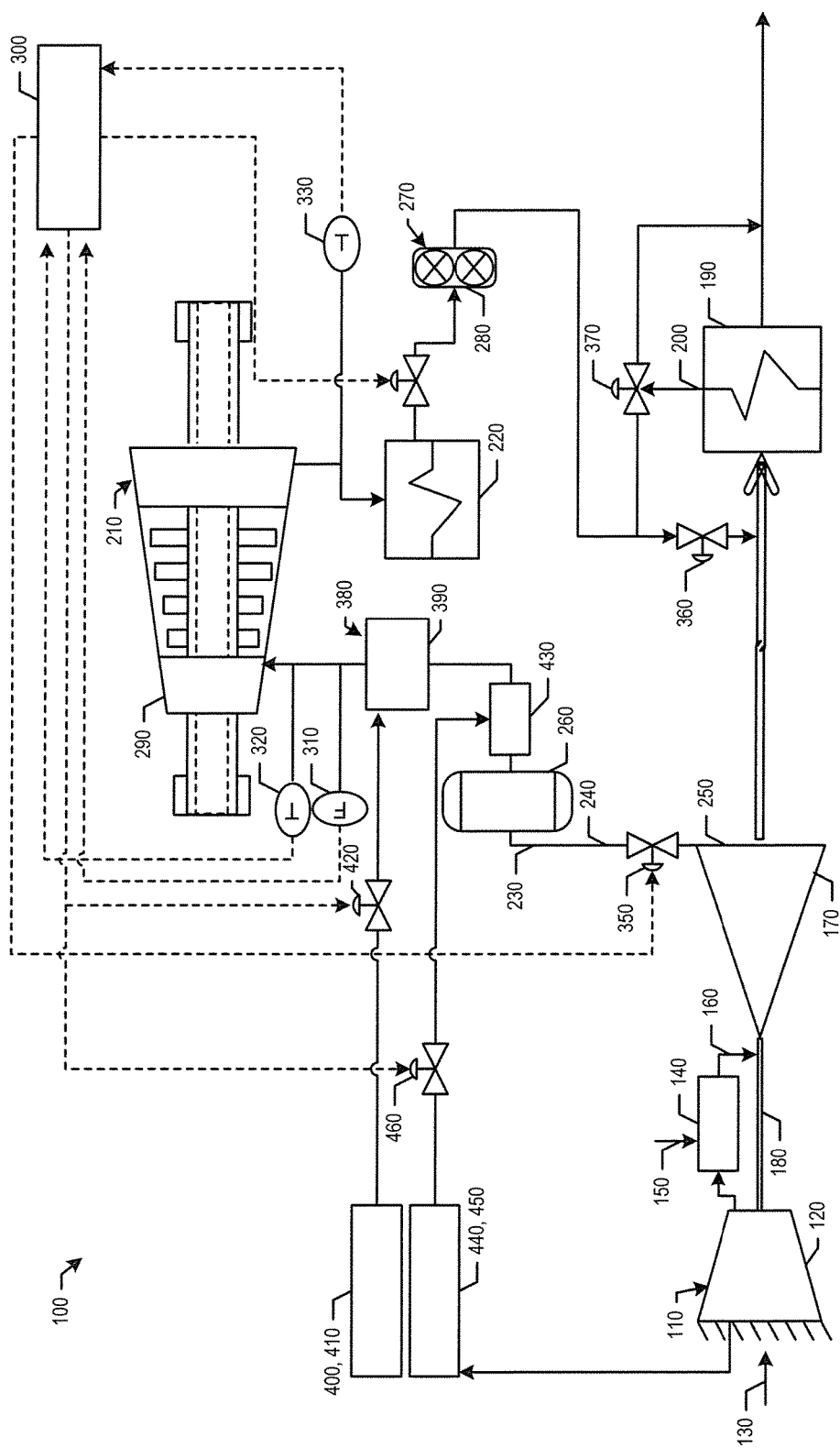
FIG. 4 a schematic diagram of an alternative embodiment of a combined cycle power generation system with a steam turbine preheating system as may be described herein.

FIG. 4 shows a further embodiment of the steam turbine preheating system 230 as may be described herein. In this example, the ejector 430 may use a compressor air extraction 470 instead of the ambient air 440 or the filtered air 450 described above. The compressor air extraction 470 may be delivered to the ejector 430 so as to increase the mass flow rate of the flow of the hot combustion gases 160 flowing through the spray system 390 to the shell 290 of the steam turbine 210. The flow rate may be monitored by the controller 300 via the flow rate sensor 310 or otherwise. Other components and other configurations may be used herein.

Figure 5:
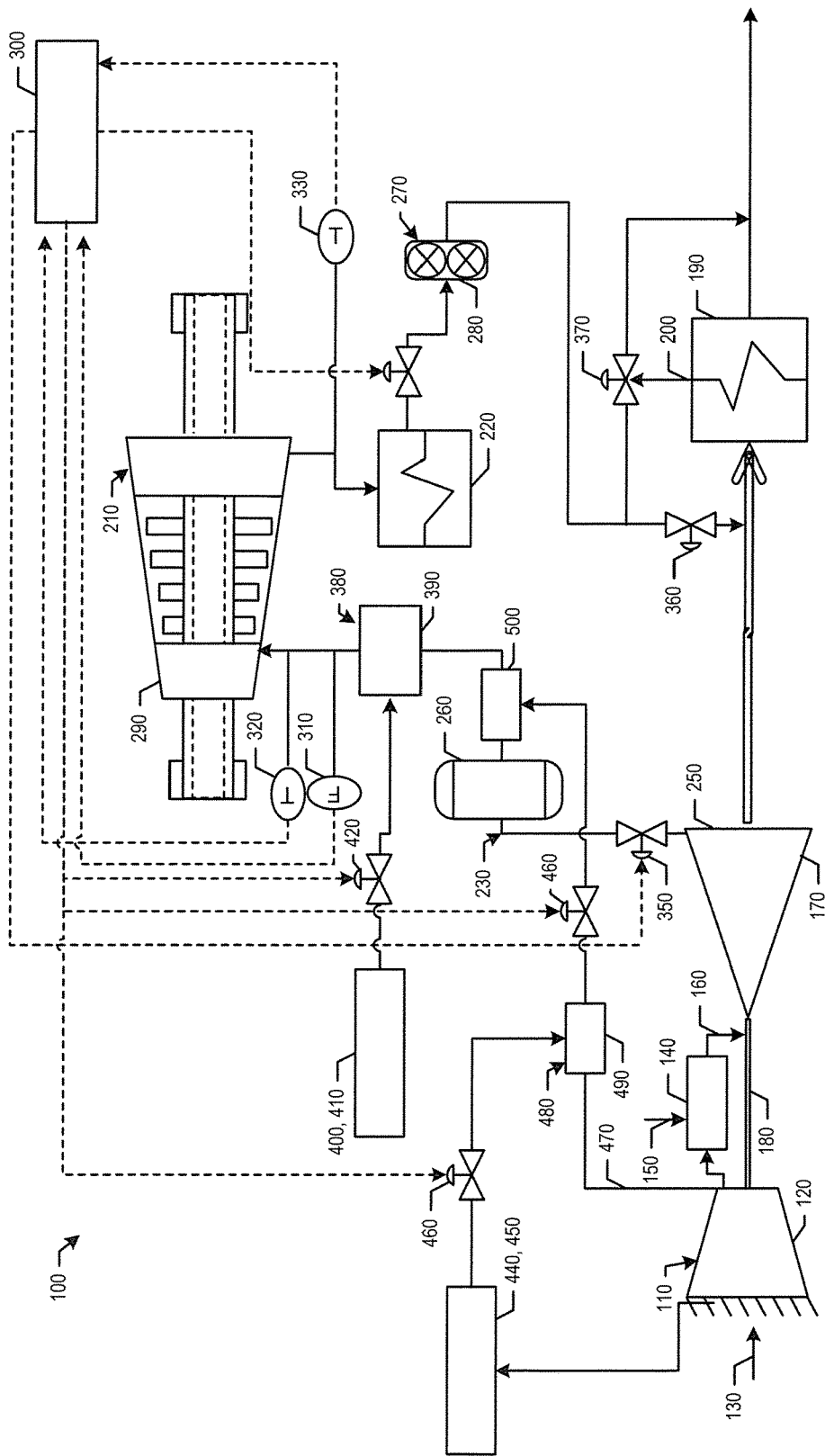
FIG. 5 is a schematic diagram of an alternative embodiment of a combined cycle power generation system with a steam turbine preheating system as may be described herein.

FIG. 5 shows a further embodiment of the steam turbine preheating system 230 as may be described herein. In this example, the steam turbine preheating system 230 may use a cascading ejector system 480. The cascading system ejector system 480 may use a first ejector 490. The first ejector 490 may pull in either the ambient air 440 or the filtered air 450 and the compressor air extraction 470 to create a first mixed flow. This first mixed flow then may be sent to a second ejector 500. The second ejector 500 may be in communication with the extraction 240 from the casing 250 of the turbine 170. The resultant flow then may be through the spray system 390 to the shell 290 of the steam turbine 210. The flow rate may be monitored by the controller 300 via the flow rate sensor 310 or otherwise. Other components and other configurations may be used herein.

Figure 6:
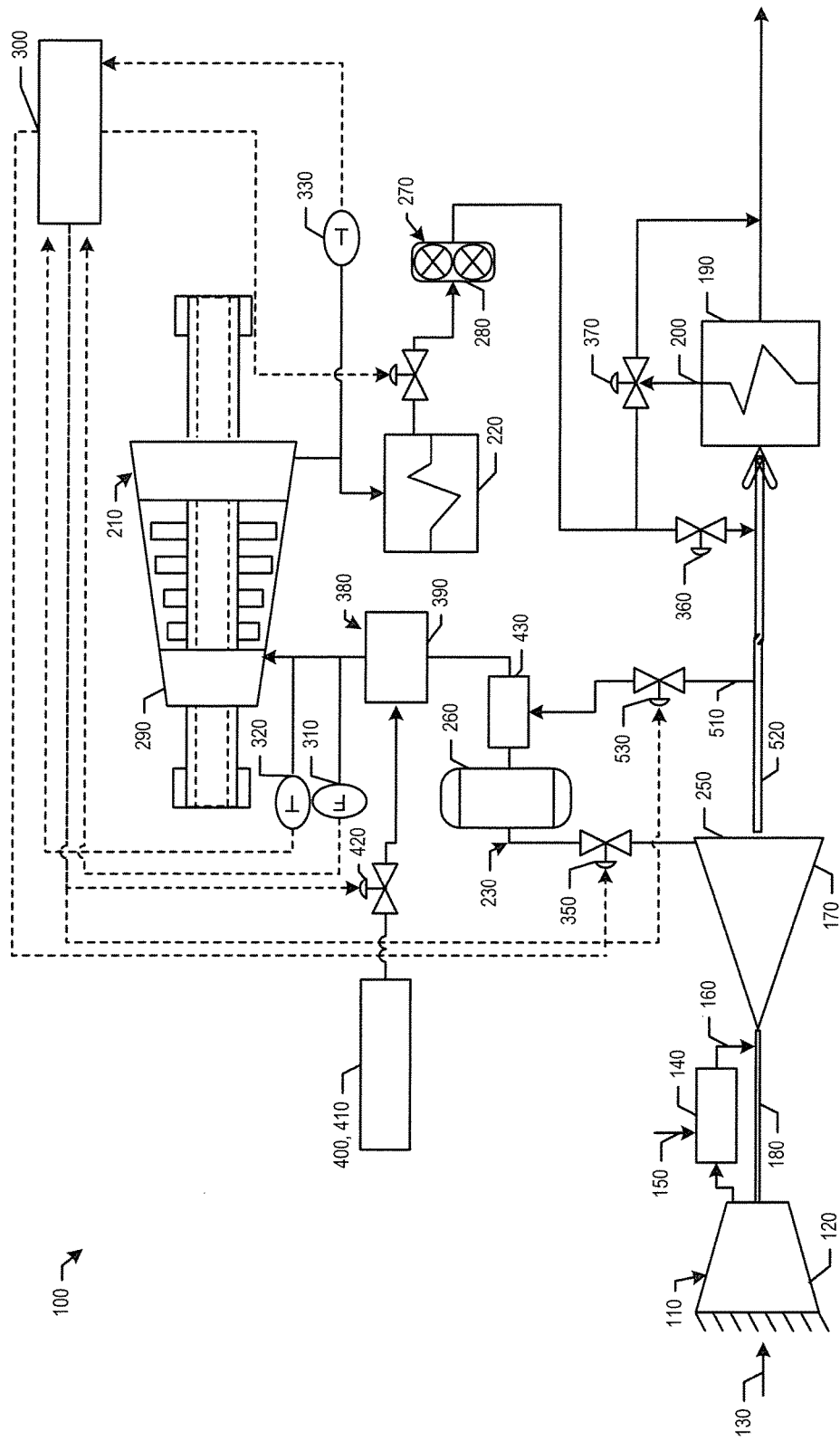
FIG. 6 is a schematic diagram of an alternative embodiment of a combined cycle power generation system with a steam turbine preheating system as may be described herein.

FIG. 6 shows a further embodiment of the steam turbine preheating system 230 as may be described herein. In this embodiment, the ejector 430 may be in communication with a further combustion gas extraction 510 from downstream of the turbine 170 or otherwise. Specifically, a downstream exhaust duct 520 may direct the further combustion gas extraction 510 to the ejector 430 via an exhaust valve 530. The extractions 240, 510 may be mixed in the ejector 430 so as to increase the mass flow rate therethrough. The flow rate may be monitored by the controller 300 via the flow rate sensor 310 or otherwise. Other components and other configurations also may be used herein.

The embodiments of the steam turbine preheating system 230 thus may use the extractions 240 of the hot combustion gases 160 from the casing 250 of the turbine 170 to preheat the steam turbine 210. Preheating the steam turbine 210 during start-up should reduce the overall start-up time of the plant as a whole. Specifically, the plant may not have to wait for traditional steam conditions to be met before introducing steam to the steam turbine to begin the warming process. Reducing start-up time generally lowers emissions and improves fuel consumption. Moreover, improved-start up times also provides operational flexibility, increased performance, and increased competitiveness.

It should be apparent that the foregoing relates only to certain embodiments of the present application and the resultant patent. Numerous changes and modifications may be made herein by one of skill in the art without departing from the general spirit and scope of the invention as defined by the following claims and the equivalents thereof.

We claim:

1. A power generation system, comprising:
   a gas turbine engine;
   the gas turbine engine creating a flow of combustion gases;
   a steam turbine; and
   a steam turbine preheating system;
   wherein the steam turbine preheating system receives an extraction of the flow of combustion gases and delivers the extraction to the steam turbine to preheat the steam turbine.

2. The power generation system of claim 1, wherein the gas turbine engine comprises a turbine casing and wherein the extraction extends from the turbine casing to the steam turbine.

3. The power generation system of claim 1, wherein the steam turbine preheating system comprises a filter system that filters the extraction of the flow of combustion gases.

4. The power generation system of claim 3, wherein the filter system comprises an electrostatic precipitator therein.

5. The power generation system of claim 1, wherein the steam turbine preheating system comprises a blower downstream of the steam turbine.

6. The power generation system of claim 1, wherein the steam turbine comprises a steam turbine shell and wherein the extraction extends to the steam turbine shell.

7. The power generation system of claim 1, further comprising a heat recovery steam generator.

8. The power generation system of claim 1, wherein the steam turbine preheating system comprises an attemperation system.

9. The power generation system of claim 8, wherein the attemperation system comprises a spray system for at least one of a water injection and a steam injection.

10. The power generation system of claim 1, wherein the steam turbine preheating system comprises an ejector.

11. The power generation system of claim 10, wherein the ejector is in communication with at least one of an ambient air flow, a filtered air flow, and a compressor air extraction.

12. The power generation system of claim 1, wherein the steam turbine preheating system comprises a cascading ejector system.

13. The power generation system of claim 12, wherein the cascading ejector system comprises a first ejector in communication with a compressor of the gas turbine engine and a second ejector in communication with a turbine of the gas turbine engine.

14. The power generation system of claim 1, wherein the steam turbine preheating system comprises a further extraction from downstream of the gas turbine engine.

15. A method of preheating a steam turbine in a power generation system, comprising:
   extracting hot combustion gases from a gas turbine;
   filtering the extraction of the hot combustion gases; and
   flowing the extraction of the hot combustion gases to the steam turbine to warm a shell of the steam turbine.

16. A combined cycle power generation system, comprising:
   a gas turbine engine;
   the gas turbine engine creating a flow of hot combustion gases;
   a steam turbine;
   a heat recovery steam generator; and
   a steam turbine preheating system;
   wherein the steam turbine preheating system receives an extraction of the flow of combustion gases and delivers the extraction to the steam turbine to preheat the steam turbine.

17. The combined cycle power generation system of claim 16, wherein the gas turbine engine comprises a turbine casing and wherein the extraction extends from the turbine casing to the steam turbine.

18. The combined cycle power generation system of claim 16, wherein the steam turbine preheating system comprises a filter system that filters then extraction of the flow of combustion gases.

19. The combined cycle power generation system of claim 16, wherein the steam turbine comprises a steam turbine shell and wherein the flow of hot combustion gases extends from the gas turbine engine to the steam turbine shell.

20. The combined cycle power generation system of claim 16, wherein the steam turbine preheating system comprises a spray system for at least one of a water injection and a steam injection.

* * * * *